June 27, 1961 G. H. JOHNSON 2,990,514
PRODUCTION LINE IMPULSE TESTING APPARATUS
Filed Sept. 11, 1958 3 Sheets-Sheet 1

INVENTOR.
Graham H. Johnson
BY Lee H. Kaiser
Attorney

June 27, 1961

G. H. JOHNSON 2,990,514

PRODUCTION LINE IMPULSE TESTING APPARATUS

Filed Sept. 11, 1958

INVENTOR.
Graham H. Johnson
BY
Lee H. Kaiser
Attorney

United States Patent Office 2,990,514
Patented June 27, 1961

2,990,514
PRODUCTION LINE IMPULSE TESTING
APPARATUS
Graham H. Johnson, Zanesville, Ohio, assignor to McGraw-Edison Company, Milwaukee, Wis., a corporation of Delaware
Filed Sept. 11, 1958, Ser. No. 760,509
43 Claims. (Cl. 324—55)

This invention relates to impulse testing of electrical apparatus and more particularly to improvements in means for the detection of failures in electrical apparatus during impulse testing.

Electrical apparatus such as transformers are impulse tested to determine the ability of the apparatus to withstand high transient voltages which may occur during service. Means for performing these tests on electrical transformers generally include means for impressing a steep wave front voltage on the high voltage winding of the transformer and means for observing the resulting current wave emerging therefrom.

The more sensitive fault detection methods depend upon the fact that in some manner, and to some degree, impedance from high voltage line terminal to ground will be reduced as a result of a fault within the transformer. Such reduction in transformer impedance may result from shorting out a portion of the interturn and/or interlayer capacitance, thereby effectively reducing the capacitive reactance between line terminal and ground or by creating a closed conducting path that is magnetically linked to an exciting coil, thereby creating a loading effect which reduces the effective inductive reactance between line terminal and ground. As a result of this reduction in impedance, the current waves emerging from the winding incident to the impressed steep wave front voltage will differ under fault and no-fault conditions. By observing these waves, it can therefore be determined when a transformer fault occurs.

A transformer often gives its first symptom of distress by a short duration fault signal. Such short time duration faults are usually the most difficult to detect and may become permanent upon a slight increase in impulse voltage.

Prior art production line impulse testing apparatus generally included means for comparing oscillograms of the surge produced current waves emerging from the winding being tested with oscillograms of a wave obtained from a typical winding for the particular transformer. One of the major problems of impulse testing utilizing this prior art type of apparatus is to ascertain the occurrence of short duration low amplitude faults. For convenience in discussing such short duration faults, the current wave resulting from the normal no-fault impedance of the transformer will be referred to as "noise signal" while any deviation from the current wave resulting from a reduction in impedance incident to a fault will be referred to as "fault signal." The sensitivity of fault detection devices is dependent upon the ratio of fault signal to noise signal, and because it is difficult to amplify the fault signal without also amplifying the noise signal, prior art impulse testing devices were incapable of detecting such short duration low amplitude faults.

One prior art method of production line impulse testing of distribution transformers utilizes pre-recorded oscilliograms obtained from standard transformers corresponding to the transformers being tested, to which are compared the unrecorded oscillograms appearing on an oscilloscope screen as each transformer on the production line is tested. This method had several disadvantages. First, it necessitated glancing back and forth between an oscilloscope viewing screen and a reference oscillogram, which is fatiguing, slow, and does not permit accurate comparison. Further, if the reference oscillogram is in the form of a transparency covering the viewing screen, there are many practical difficulties such as positioning, size, and parallax that tend to prevent a good superposition of traces. Also, differences between the test and reference oscillograms that result from normal manufacturing variations place a burden of judgment upon the operator. Since the number of different transformer designs that require testing may be counted in thousands, time is lost in looking up the proper reference oscillogram. The preparation of reference oscillograms is laborious and expensive and rush orders that call for new designs are delayed by the time required to prepare such reference oscillograms.

In recognition of all of the factors that tend to diminish the reliability of production line fault detection when an oscilloscope is used according to the prior art hereinbefore described, additional automatic devices are sometimes employed. In general, these depend upon integration of the signal that would otherwise go to the oscilloscope, so that a smoothly rising oscillation-free voltage is obtained. The crest of this voltage is then compared to a D.C. reference voltage, and automatic circuits are arranged to operate visual or audible alarms if the two voltages do not agree. The D.C. reference voltage must be adjusted by the operator for each different class of transformer, which is time consuming and introduces the possibility of error. Since the integrated signal voltage is a function of the area beneath the trace of the oscillogram that would otherwise appear on the oscilloscope, and since short-duration, low-amplitude faults may produce a negligible percentage change in this area because of the high noise-signal to fault-signal ratio, such devices are insensitive to this type of fault. A still further disadvantage of such automatic prior art fault detection device is that provision must be made to prevent normal manufacturing variations between transformers of the same design from operating the alarm system, and this can be done only by desensitizing the device.

Prior art impulse testing apparatus and the objects and advantages of the present invention will be better understood by reference to the detailed description and the accompanying drawing wherein:

FIGS. 1 and 3 are equivalent circuits of a distribution transformer undergoing test;

FIGS. 3 and 4 are graphs showing voltage and current conditions within the winding undergoing test following a voltage impulse;

FIG. 7 is a circuit diagram of surge impulse producing means suitable for use with the invention.

A transformer offers a complex impedance to a voltage impulse which, in general, includes interconnected inductances and capacitances. The impedance is determined largely by the winding arrangement. The invention will be described with reference to a core type distribution transformer having two high voltage sections, although it will be understood that the invention may be used in impulse testing other types of transformers. The complex impedance offered by such a core type distribution transformer having two high voltage sections may be represented by the schematic circuit diagrams of FIGS. 1 and 3. Such core type transformer includes high voltage winding L having inductive reactance represented by L, line terminal $H_1$ and ground terminal $H_2$, and low voltage winding S having center tap $X_2$. The layer-to-layer capacitances $C_1$, $C_2$, $C_3$ and $C_4$ within the primary winding may be represented by a series-connected capacitive current path between the line terminal $H_1$ and the ground terminal $H_2$ and which is interconnected at fairly equal intervals with the inductive path L of the winding itself. A capacitive coupling $C_5$ exists through the barrier insulation between the high voltage winding and the low voltage winding S which coupling $C_5$ may be represented between the midpoint P of the primary winding and the low voltage windings. If a steep wave front voltage is impressed from $H_1$ to grounded terminal $H_2$, the initial voltage distribution within the transformer will depend upon the voltage dividing characteristics of the capacitive network $C_1$, $C_2$, $C_3$ and $C_4$, since the capacitive network presents a low impedance path to suddenly applied voltages, while the inductive path L presents high impedance thereto. On the other hand, because the capacitive path offers a high impedance to a sustained voltage, and the inductive path offers a relatively low impedance thereto, the final voltage division is determined substantially by characteristics of the inductive path L. In many transformer designs, the initial voltage division in the winding due to the capacitive network does not match the final voltage division thereof due to the inductive impedance at corresponding points in the winding. When the initial and final voltage divisions do not agree, there is a period of L-C oscillations which are gradually damped out during the transition between initial and final voltage division.

An important source of inequality of voltage division across the capacitance path $C_1$, $C_2$, $C_3$ and $C_4$ and the inductive path L connecting $H_1$ and $H_2$ is introduced by the capacitance $C_5$ through the insulation barrier to the grounded low voltage winding S. Because of the existence of $C_5$, the high voltage winding terminal point P of capacitance $C_5$ will be at a lower initial potential $e$ (see FIG. 2) with respect to ground when a voltage surge is impressed at $H_1$ than the potential $e'$ it would assume if the barrier capacitance $C_5$ were non-existent. Consequently, the average impressed volts per turn between $H_1$ and P will be higher than that between P and $H_2$. If magnetic coupling is strong between these two halves of the high voltage winding on opposite sides of P, a counter E.M.F. may be introduced between $H_2$ and P that exceeds the impressed E.M.F. across the same portion. The resulting initial current flow will be in the directions indicated by the broken lines and will continue until the barrier capacitance $C_5$ has been charged sufficiently to bring the high voltage winding terminal P up to a potential $e_1$ that is equal to the final voltage dictated for this point by the inductive path characteristics. During the interval in which $C_5$ is being charged, the magnetic fields produced by the currents flowing in opposite directions in the upper and lower winding halves tend to be mutually cancelling. However, leakage flux between the two halves produces a net magnetic field which is near maximum when the barrier capacitance terminal point P first reaches the potential $e_1$ it finally assumes after oscillations have been damped out. The collapse of this field maintains the direction of the current shown until the barrier capacitance $C_5$ is charged to a higher potential $e_2$. The capacitance $C_5$ then discharges and causes current to flow in the winding halves in directions opposite to the arrows in FIG. 1, thereby building up the magnetic field in the opposite direction. These oscillations continue until damped out by losses within the winding. It is evident that the mechanism just described produces an oscillating component in the total current at $H_2$ and a proportional oscillating component of opposite phase in the total current through $X_2$.

Figures 1, 2, 3, 4, 7:
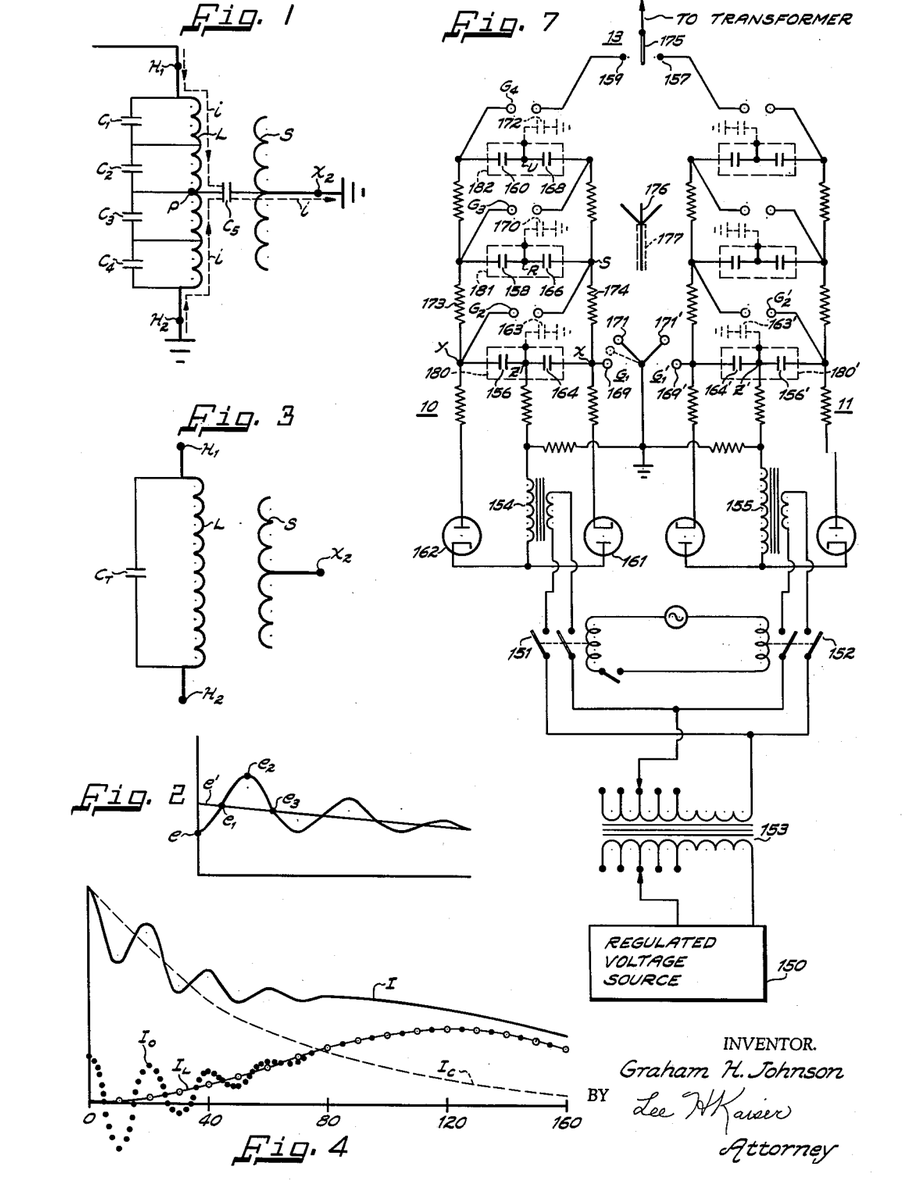

As shown in FIG. 3, current entering $H_1$ is presented with parallel paths composed of the total distributed capacitance $C_t$ of the winding and the winding inductance L. As a result of the current division therebetween, the current wave emerging from $H_2$ is composed of a pure capacitive component due to the distributed capacitance $C_t$, a pure inductive component due to inductance L, as well as the oscillation component discussed above. These components are illustrated in FIG. 4 in which $I_c$ is the pure capacitive component, $I_1$ is the pure inductive component and $I_o$ is the oscillation component. The current wave I emerging from $H_2$ is the resultant of $I_c$, $I_1$ and $I_o$.

The noise signal discussed hereinbefore thus includes a pure capacitive component $I_c$ and a pure inductive component $I_1$, and these components will be hereinafter referred to as the "capacitive noise signal" and the "inductive noise signal," respectively.

It is an object of the invention to provide a new and improved apparatus for the detection of impulse produced failures in electrical transformers. A further object of the invention is to provide such apparatus which has increased sensitivity in detecting impulse produced failures.

Another object of the invention is to provide production line impulse testing apparatus for distribution transformers in which faults are detected by comparing an impulse produced signal with a no-fault signal peculiar to the transformer undergoing test.

It is a further object of the invention to provide voltage impulse testing apparatus of a type wherein faults are detected by observing the effects of impulse produced signals and in which greater sensitivity is provided by increasing the ratio of the fault signal to the noise signal. Another object is to provide such impulse testing apparatus wherein greater sensitivity is provided by cancellation of a no-fault portion of the signal. It is an object of the invention to provide such production line impulse testing apparatus having automatic fault detecting means of the integrating type which obviates the necessity of adjusting a reference signal whenever a different class of transformer is to be tested and wherein the fault signal represents a greater percentage of the area under the integrated wave than in prior art devices.

It is another object of the invention to provide voltage impulse testing apparatus of a type wherein faults are detected by observing the effects of impulse produced signals and in which greater sensitivity is provided by the cancellation of the capacitive noise signal. It is a still further object of the invention to provide such voltage impulse testing apparatus in which greater sensitivity is provided by the cancellation of the inductive noise signal. It is yet another object of the invention to provide such voltage impulse testing apparatus in which greater sensitivity is provided by the cancellation of an oscillation component of the no-fault portion of the signal.

It is a still further object of the invention to provide production line impulse testing means which superimposes a visual representation of the current wave emerging from the transformer winding being impulse tested on a normal representation of a normal no-fault wave taken of the same winding to permit visual comparison thereof.

Still another object of the invention is to provide impulse testing apparatus having means to generate reduced wave and full wave surge impulses and to sequentially impress said impulses on the winding to be tested and wherein the current waves emerging from the winding incident to said impulses may be visually compared on a long persistence oscillographic screen.

Another object of the invention is to provide a voltage impulse testing device for distribution transformers which gives an automatic signal upon occurrence of an impulse-produced failure. It is also an object of the invention to provide impulse testing apparatus wherein reduced and full amplitude surge impulses are sequentially applied to the winding being tested and wherein means for integrating the current-time waves of the currents emerging from said winding incident to said impulses are provided to automatically detect impulse produced failures.

The invention accomplishes certain of its objects by increasing the "fault signal" to "noise signal" ratio through noise signal cancellation, thereby making detection of the fault signal easier. A produtcion line impulse testing device for electrical transformers must be adapted to test a large number of different designs and kva ratings having different impedance characteristics. Consequently, it is difficult to devise a single means for completely cancelling all three of the noise signal components. However, even if such noise cancellation were not perfect, any appreciable degree of cancellation allows the amplification of the uncancelled signal with substantial improvement in fault signal detection sensitivity.

Other objects of the invention are accomplished by producing a "no-fault current wave" for each transformer undergoing test which indicates to the operator how the current wave should appear under no-fault conditions and to which the operator may compare the impulse produced wave. This eliminates variations between the standard wave and the test wave resulting from manufacturing tolerances and obviates difficulties inherent in prior art testing devices which required the operator to choose a separate standard reproduction for each transformer design undergoing test and compare it with the test wave. In accordance with the invention, a voltage impulse proportional to the test impulse, but of sufficiently reduced amplitude so that failure will not occur, is impressed on the transformer winding shortly before the full voltage impulse is applied thereto. By suitably coupling the transformer winding to an oscilloscope having a screen whose persistence is long compared to the time between impulses, the two current waves emerging from the transformer may be visually compared. Equality of the two images on the oscilloscope screen for no-fault conditions may be accomplished by automatically switching voltage dividing means in the interval between impulses, and time synchronization of the waves is accomplished by coupling the sweep triggering means of the oscilloscope to the impulse producing means. Automatic fault detection is achieved by coupling the transformer winding to means responsive to a predetermined difference in sequentially applied current signals.

Figure 5:
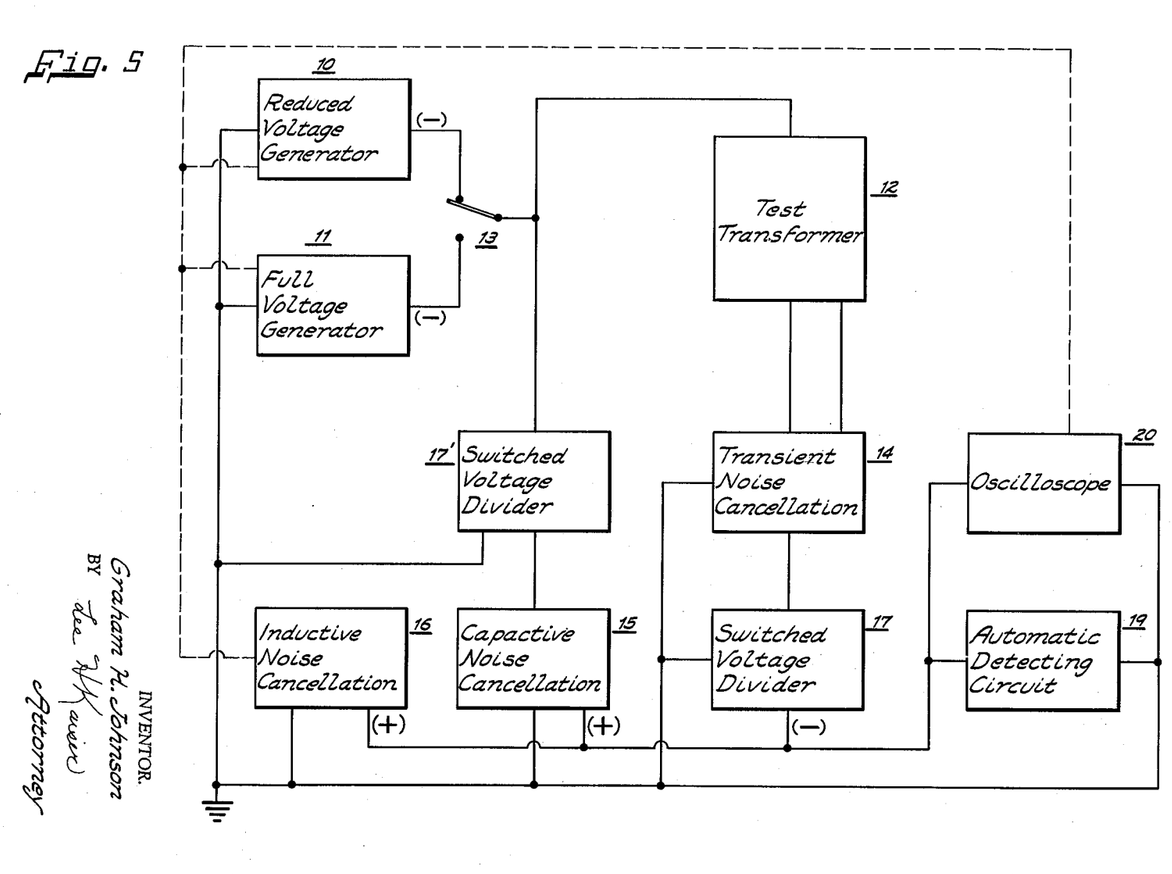
FIG. 5 is a block diagram of a preferred embodiment of the invention.

FIG. 5 is a block diagram of a preferred embodiment of the invention showing reduced and full voltage surge generators 10 and 11, respectively, which may be sequentially connected to transformer 12 undergoing test by means of selector switch 13. The signals emerging from transformer 13 incident to the discharge of generators 10 and 11 through the transformer 12 are combined with signals from oscillation, capacitive and inductive noise cancellation means 14, 15 and 16, respectively, whereby the corresponding components of the impulse-produced signals are cancelled. Voltage dividers 17 and 17' insure that the magnitude of the input signals to automatic indicating means 19 and oscilloscope 20 will be equal under no-fault conditions for full and reduced voltage impulses delivered by surge generators 10 and 11.

Reduced voltage generator 10 is so calibrated as to insure that its voltage impulse is low enough not to produce failure of transformer 12, this value preferably being less than approximately one half of the magnitude of the full voltage impulse. Selector switch 13 is disposed between the voltage impulse generators 10 and 11 and the transformer 12, whereby the impulse generators may be sequentially connected to the transformer 12 and the reduced and full voltage impulses sequentially impressed on the winding thereof undergoing test. Actuation of switch 13 takes place in the short interval between discharge of the impulse generators 10 and 11. Suitable wave shaping elements discussed hereinafter are associated with the voltage impulse generators so that standard 1½ × 40 ms. voltage test waves (i.e., one which takes 1½ microseconds to reach peak value and 40 microseconds to decay to one half peak value) are impressed on the winding undergoing test by the impulse generators 10 and 11. As a result, the current waves emerging from the winding undergoing test incident to the impulses will be identical under no-fault conditions save for the fact that the wave associated with the reduced voltage impulse has an amplitude different than that of the full wave.

Voltage divider 17, disposed between the transformer 12 and the indicating devices 19 and 20, allows the degree of coupling between these indicating devices and the transformer to be so modified in the interval between the full and reduced voltage impulses that the current waves resulting therefrom appear equal under normal no-fault conditions. In this manner, a particular reference signal for each transformer is derived which is not dependent on the design of the transformer undergoing test or variations in transformer characteristics due to manufacturing tolerances and against which the test signal may be compared. It is understood that the voltage divider 17 may be disposed at any point between the winding undergoing test and the indicating devices 19 and 20.

As heretofore discussed, the current waves emerging from the transformer have transient, capacitive and inductive noise components. The output from the winding under test is connected to oscillation noise cancellation means 14 in which the current wave emerging from transformer 12 is combined with an oscillation signal which is 180 degrees out of phase with and proportional to the oscillation component of the current wave, thereby resulting in the cancellation of at least a portion of the said oscillation component. The manner in which this oscillation signal is derived will be discussed in greater detail hereinafter. Also, means 15 for generating a capacitive signal proportional to the capacitive component of the current wave and means 16 for generating an inductive signal proportional to the inductive component of the current wave are coupled to the output of the oscillation component cancellation means 15. This coupling is done in such a manner that the polarity of the capacitive and inductive signals is opposite to that of the corresponding components of the current wave, whereby cancellation of at least a portion of the capacitive and inductive components of the current wave is achieved. While it is understood that signal generating means 15 may be independent of the impulse generators 10 and 11, in the preferred embodiment it is coupled thereto through voltage divider 17'. In operation, voltage divider 17' is switched in the short interval between discharge of the reduced voltage wave generator 10 and the full voltage wave generator 11 so that the input to the capacitive noise cancellation means 15 from impulse generators 10 and 11 are equal for the full and reduced voltage impulses. By coupling these cancellation signal generating means to the impulse generators 10 and 11, both synchronization and equality of wave form can be achieved between the output of the cancellation signal generating means and the components of the current wave emerging from the winding incident to the voltage impulses. As a result of these cancellations the "fault signal" to "noise signal" ratio of the input signal to the indicating devices 19 and 20 becomes greater, thereby materially simplifying the detection of fault signals which, without such cancellation, may be only a small portion of the total current wave.

The sweep triggering means of oscilloscope 20 is coupled to voltage impulse generators 10 and 11 so that the oscilloscope reproductions of the current waves emerging from the transformer winding undergoing test incident to the full and reduced voltage impulses will be in synchronism and superimposed on the oscilloscope screen. By the use of a long persistence screen, the reproduction of the test wave may be visually compared to the standard wave form provided by the reduced wave.

Although a pair of voltage dividing means 17 and 17' are shown in FIG. 5, it will be appreciated that if suitably placed, a single voltage divider disposed between the point at which the signals from the cancellation means 14, 15 and 16 are combined and the indicating devices 19 and 20 could provide the desired equality of signals to the indicating devices for the reduced and full voltage impulses.

Figure 6:
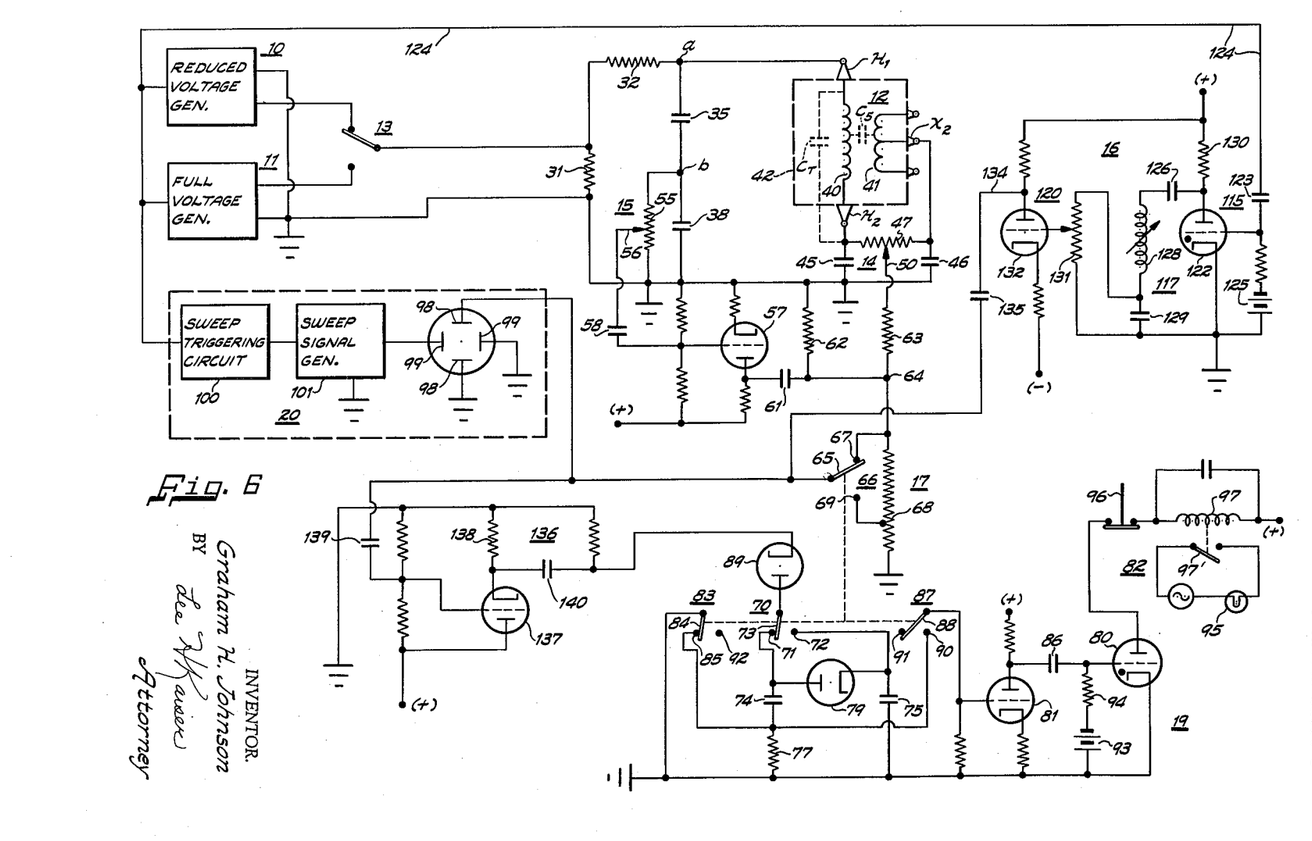
FIG. 6 is a circuit diagram of the preferred embodiment of FIG. 5.

FIG. 6 shows the details of the cancellation and indicating circuits of a preferred embodiment of the invention. As has been discussed heretofore, reduced and full voltage surge generators 10 and 11 respectively are connected to transformer 12 through selector switch 13 whereby reduced and full voltage impulses may be sequentially impressed on the winding undergoing test. Suitable wave shaping elements 31, 32, 35 and 38 are disposed between the transformer 12 undergoing test and the impulse generators 10 and 11, whereby the voltage wave impressed on primary winding 40 of transformer 12 has the desired $1\frac{1}{2} \times 40$ microsecond shape. Capacitors 35 and 38 are also part of the capacitive component cancellation circuit 15 which will be discussed hereinafter. The transformer 12 undergoing test includes the high voltage winding 40, a low voltage winding 41 and a metallic tank 42 surrounding said windings. The high voltage winding 40 has a line terminal $H_1$ and a ground terminal $H_2$, while the low voltage winding 41 has a center tap $X_2$. The voltage impulses are impressed on high voltage winding 40 through line terminal $H_1$.

As a result of the mechanics that lead to oscillation in distribution type transformer windings as heretofore discussed, the oscillation component of the current at $H_2$ is proportional to and substantially 180 degrees out of phase with the oscillation component at $X_2$. This out of phase relationship is utilized in the oscillation component cancellation means 14 by combining the oscillatory current at $X_2$ with the current wave emerging from $H_2$ so that at least a portion of the oscillation component of the current wave from $H_2$ will be cancelled.

The essentials of oscillation component cancellation means 14 include a bridge circuit comprising a first reactive impedance inserted between $H_2$ and ground, a second impedance of the same reactive type between $X_2$ and ground, and a third impedance disposed between $H_2$ and $X_2$. In the preferred embodiment of the invention, the reactive impedances between $H_2$ and ground and $X_2$ and ground are capacitors 45 and 46 respectively while the impedance between $H_2$ and $X_2$ is voltage dividing resistor 47.

In operation voltage signals proportional to the current waves emerging from $H_2$ and $X_2$ as the result of the voltage impulses impressed on winding 40 and which have oscillation components 180 degrees out of phase with each other are derived across capacitors 45 and 46 respectively. It is desirable that signals appearing across capacitors 45 and 46 be combined in such a manner that the oscillation components thereby cancel. This equality of opposite polarity oscillation component signals may be accomplished by selecting capacitors 45 and 46 to have the proper values. However, in the embodiment illustrated in FIG. 6 this combination of equal magnitude oscillation component signals is achieved by utilizing an impedance 47 having a tap 50 such that the impedance between $H_2$ and tap 50 is properly proportioned relative to the impedance between $X_2$ and tap 50. It is understood, however, that voltage divider 47 may be any type of impedance or combination of impedances and that the desired equality of voltages at tap 50 may also be achieved by making either or both of capacitors 45 and 46 variable.

The input impedance characteristics of the indicating devices are taken into consideration in the choice of impedances to be used.

The pure capacitive component of the current wave emerging from $H_2$ as a result of a voltage impulse impressed on $H_1$ and the resulting voltage signal derived across capacitor 45 is at all times a function of the impressed wave. Therefore, the capacitive component of the voltage signal derived across capacitor 45 may be cancelled by generating a capacitive signal which is of opposite polarity and is the same function of impressed $1\frac{1}{2} \times 40$ ms. wave. In the preferred embodiment of the invention, this signal is generated in capacitive noise cancellation means 15 which includes a capacitive voltage divider formed by the serial arrangement of capacitors 35 and 38 in parallel with the capacitive voltage divider formed by the distributed capacitance $C_t$ of winding 40 and capacitance 45 between $H_2$ and ground. A voltage divider 55 having adjustable tap 56 is shunted across capacitor 38 whereby a capacitive signal proportional to the capacitive component of the current wave emerging from $H_2$ may be taken off voltage divider 55 by suitable adjustment of tap 56. It will be understood that the capacitive component cancellation signal may be achieved by proper selection of capacitors 35 and 38. However, when a variety of transformer types are to be tested, adjustability of magnitude of this signal is conveniently obtained by utilizing voltage divider 55. This signal at tap 56 is applied to the grid of polarity inverting tube 57 through suitable coupling capacitor 58. The output of the tube 57 is coupled through suitable coupling elements 61 and 62 to resistor 63 in series with tap 50 of impedance 47. By coupling the output of tube 57 to resistor 63 on the side 64 away from tap 50, the capacitive signal derived from the output of tube 57 will be of opposite polarity to that of the capacitive component of the impulse produced signal appearing at tap 50. In this manner cancellation of at least a portion of the capacitive component of the signal appearing at tap 50 is achieved.

If, as a result of a fault, the distributed capacitance $C_t$ increases resulting in a reduction of the capacitance reactance of winding 40, a change in the current division between the parallel capacitive voltage dividers will occur. Consequently, a larger proportion of the total current at point $a$ will flow from $H_1$ to ground while a smaller proportion thereof will flow through capacitors 35 and 38 than under no-fault conditions. Since the impedance between $H_2$ and ground and between point $b$ and ground remains unchanged, the voltage signal across capacitor 45 will become proportionally larger while the voltage signal across capacitor 38 will become proportionally smaller. Because of the inversion of the polarity of the signal across capacitor 38, the increased voltage signal across capacitor 45 is added algebraically with the decrease of the opposite polarity voltage at the output of tube 57 to provide a larger fault signal than could be obtained from a single source. The use of such a parallel capacitive voltage divider for capacitive component cancellation inherently results both in time synchronization between the test wave and the generated signal and in equal magnitudes of the capacitive components of the test wave and the generated signal under no-fault conditions.

The voltage signal appearing at voltage divider 17 as a result of the voltage impulses impressed on the winding 40 is either a full or reduced voltage signal representative of the current wave emerging from $H_2$ modified by the cancellation of at least a portion of the oscillation and capacitive components. By means of voltage divider 17 the full voltage signal may be so modified that its amplitude at the input to the indicating devices 19 and 20 is equal to that of the reduced voltage signal under no-fault conditions. Voltage divider 17 includes switch 65 and tapped resistor 68. In operation, movable contact 65 of switch 66 is placed on upper fixed contact 67, thus shorting out resistor 68 prior to the discharge of the reduced voltage generator. The movable contact 65 is switched to the lower fixed contact 69 prior to the discharge of the full voltage generator 11 so that the upper portion of resistor 68 is inserted between winding 40 and the indicating devices 19 and 20, whereby the amplitude of the full voltage signal is made equal to that of the reduced voltage signal.

As discussed hereinbefore the pure inductive component $I_1$ of the current wave emerging from $H_2$ as a result of a voltage impulse applied to test winding 40 is largely a function of the overall inductance L of winding 40. Inductive noise cancellation means 16 generates a signal of similar wave form but of opposite polarity to the pure inductive component $I_1$ so that combination of the output of inductive cancellation means 16 and the signal emerging from $H_2$ results in cancellation of the inductive noise component. Inductive noise cancellation generator 16 includes means 115 responsive to discharge of either surge generator 10 or 11 for synchronizing the generated signal and the inductive component of the test wave, means 117 for generating a signal of wave form similar to that of the pure inductive component, and coupling means 120 for combining the generated signal with the impulse produced signal. Synchronizing means 115 includes a thyratron 122 having a grid coupled through capacitor 123 and coupling circuit 124 to the reduced and full voltage surge generators 10 and 11. Thyratron 122 is normally biased to cutoff by a potential source 125. The preferred embodiment of the signal generating means 117 includes a tank circuit formed by a capacitor 126 in series with a variable inductance 128, a capacitor 129, and the cathode-plate circuit of thyratron 122.

Under steady state conditions capacitor 126 is charged from the plate supply through resistor 130, variable inductance 128 and a potentiometer 131 connected to ground in parallel with capacitor 129. Coupling means 120 includes potentiometer 131 and a phase inverting tube 132, the grid of which is connected to the movable tap of potentiometer 131 and maintained at approximately ground potential under steady state conditions.

When either surge generator 10 or 11 discharges, an impulse over coupling circuit 124 causes thyratron 122 to conduct, thereby discharging capacitor 126 through variable inductance 128 and capacitor 129 and causing a voltage wave of generally sinusoidal shape to appear across capacitor 129. The voltage wave across capacitor 129 is coupled to the grid of phase inverter tube 132 through potentiometer 131, and the inverted signal is coupled through capacitor 135 to the output from voltage divider 17. If a variety of transformers are to be impulse tested, the magnitude of the output from the inductive noise cancellation generating means 16 may be adjusted by potentiometer 131. The period of the oscillatory wave form appearing across capacitor 129, and consequently the output of generating means 16, may be varied by adjusting variable inductance 128. In this manner the generated inductive noise cancellation signal is combined with the opposite polarity impulse produced signal appearing at the output of voltage divider 17 so that cancellation of at least a portion of the pure inductive component is achieved. This combination of signals occurs at a point beyond the voltage divider 17 where the full voltage generator impulse produced signal is reduced to the same magnitude as the reduced voltage generator impulse produced signal, and consequently it is unnecessary to utilize voltage dividing means between inductive noise cancellation generating means 16 and the indicating devices 19 and 20.

While in the preferred embodiment the oscillation, capacitive and inductive noise cancellation means 14, 15, and 16 respectively are shown as individual means, it will be understood that the invention also contemplates a single means for generating a composite signal having oscillation, capacitive and inductive components to accomplish cancellation.

Indicating device 19 is an automatic detecting circuit of the self-reference type. In general, it includes first and second energy storage means which may be sequentially coupled to voltage divider 17 by means of coupling circuit 136 and a selector switch 70 having fixed contacts 71 and 72 and movable contact 73, whereby the energy associated with each of the voltage impulses may be separately stored. The indicating device 19 also includes means to determine when the energy of the signal associated with the full voltage impulse exceeds that of the reduced voltage impulse by a predetermined amount which is indicative of a fault. In the preferred embodiment of the invention the first and second energy storage means are capacitors 74 and 75, respectively. Capacitor 74 has one electrode connected to fixed contact 71 and capacitor 75 has one electrode connected to fixed contact 72. The other electrode of capacitor 74 is grounded through resistor 77, while the other terminal of capacitor 75 is directly grounded. The energy comparison means includes diode 79 disposed between the ungrounded electrodes of capacitors 74 and 75, thyratron 80 coupled to diode 79 through amplifier 81 and adapted to fire when diode 79 conducts, and signal means 82 operable by the firing of thyratron 80. Movable contacts 65 and 73 of switches 66 and 70 are mechanically coupled so that the proper energy storage means will be coupled to voltage divider 17 for each of the voltage impulses. The indicating device 19 includes a second switch 83 having movable contact 84 connected to ground and a fixed contact 85 connected to the junction between capacitor 74 and resistor 77 and also includes a third switch 87 having a movable contact 88 connected to the grid of amplifier 81 and a fixed contact 90 also connected to the junction between capacitor 74 and resistor 77. Movable contacts 84 and 88 are also mechanically coupled to movable contact 65 of switch 66. In operation, when movable contact 65 of switch 66 is in the reduced voltage position, i.e., on fixed contact 67, movable contact 73 of switch 70 is on fixed contact 71 coupling capacitor 74 to voltage divider 17 through a rectifying tube 89 and the coupling circuit 136; movable contact 84 of switch 83 is on fixed contact 85 grounding the junction between capacitor 74 and resistor 77; and movable contact 88 of switch 87 is on dummy contact 91. While the switches are in these positions, as shown in FIGURE 6, the reduced voltage generator 10 is discharged through the high voltage winding 40, and the resulting output signal from voltage divider 17 causes capacitor 74 to become charged. Since the voltage signal derived across capacitor 45 is proportional to the current wave emerging from $H_2$, the charge stored on capacitor 74 is proportional to the current-time integral of this current wave. During the interval between the discharge of the reduced and full voltage generators 10 and 11, the switches 66, 70, 83 and 87 are operated to the full voltage positions, whereby movable contacts 65, 73 and 88 are moved to fixed contacts 69, 72 and 90, respectively, and movable contact 84 is moved to dummy contact 92. This couples capacitor 75 to the voltage divider 17, couples amplifier 81 to the junction between capacitor 74 and resistor 77, and inserts resistance 77 between capacitor 74 and ground. When the full voltage impulse is impressed on the winding 40, capacitor 75 is coupled to winding 40 through resistor 68, coupling circuit 136, rectifier 89, and movable contact 73, and, consequently, the charge on capacitor 75 will also be proportional to the current-time integral of the current wave emerging from $H_2$. Capacitor 75 has a capacitance preferably equal to that of capacitor 74, and inasmuch as capacitor 75 is coupled to winding 40 through resistor 68, under no-fault conditions the voltage across capacitor 75 will be equal to or slightly less than the voltage across capacitor 74 and, consequently, rectifier tube 79 will not conduct. However, if a fault should occur as a result of the full voltage generator discharge, resulting in an increased signal at voltage divider 17, the voltage across capacitor 75 will exceed the voltage across capacitor 74 thereby causing diode 79 to conduct. Discharge of capacitor 75 through diode 79 results in current flow through resistance 77 in the return path of capacitor 75, and the resultant voltage drop across resistance 77 is applied to the grid of amplifying tube 81 through fixed contact 90 and movable contact 88. This signal is amplified by tube 81 and coupled through capacitor 86 to the grid of thyratron 80 which is normally biased to a non-conducting condition by means of a D.C. source 93 and resistor 94. This signal results in the firing of thyratron 80 which conducts sufficiently to energize the coil of relay 97 which closes contacts 97' to complete an energizing circuit to indicating means 95. The indicating means 95 operates to give a continuous signal until relay 97 is de-energized by means of reset button 96. After the test has been completed, switches 65, 70, 83 and 87 are returned to their original position and the capacitors 74 and 75 are discharged by suitable means (not shown). The circuit is then ready for another test.

Although the preferred embodiment of the invention has been illustrated as including voltage divider 17 to provide equality of the charges stored on capacitors 74 and 75 incident to the reduced and full voltage impulses impressed on winding 40, it will be appreciated that the voltage divider may be omitted and equality of voltages across the energy storage means obtained by proper selection of the capacitances of capacitors 74 and 75.

Coupling means 136 between the voltage divider 17 and the indicating means 19 includes an amplifier having high-input impedance and low output impedance such as the cathode follower. Coupling means 136 provides charging currents for capacitors 74 and 75 proportional to the input signals appearing at the output of voltage divider 17. The cathode follower includes a triode 137, the cathode of which is connected to ground through resistance 138. The output from voltage divider 17 is coupled by suitable coupling elements including capacitor 139 to the grid of triode 137, and the output of the cathode follower is coupled by suitable coupling elements including capacitor 140 to the cathode of diode 89.

Oscilloscope 20 is also coupled to the winding 40 through the voltage divider 17 in parallel with automatic detecting circuit 19. By placing switch 66 in the appropriate position during the reduced and full voltage impulses, the voltages across vertical deflection plates 98 of oscilloscope 20 incident to the full and reduced impulses will be equal under no-fault conditions. The horizontal deflection plates 99 are coupled to impulse generators 10 and 11 through a sweep triggering circuit 100 and a sweep signal generator 101, whereby the horizontal sweep of oscilloscope 20 is initiated by the discharge of each of the impulse generators, thus insuring synchronism between the waves reproduced on the oscilloscope screen incident to the voltage impulses through winding 40. The details of the sweep triggering circuit 100 and the sweep signal generator 101 are well known in the art and form no part of the invention and are therefore not shown in detail. By choosing an oscilloscope screen whose persistence is long relative to the time interval between voltage impulses, the signals proportional to the current waves emerging from $H_2$ may be superimposed thereon, thereby allowing visual comparison. Because the two waves appearing on the oscilloscope screen under no-fault conditions will have the same wave shape, amplitude and time base, any deviation of one curve from the other will indicate to the operator that a fault has occurred. The reduced wave in the oscilloscope screen provides a reference wave peculiar to each transformer undergoing test and which eliminates variations in wave shape due to manufacturing tolerances as occurred in the prior art when reproduction of typical waves were utilized as standards. The reproduction of the reference reduced voltage wave and the test wave on the same screen facilitates comparison thereof and eliminates the necessity of selecting the proper standard wave form each time a different type of transformer is to be tested. While the preferred embodiment has been disclosed as including voltage divider 17 so that the standard and test wave forms are superimposed under no-fault conditions, it will be appreciated that voltage divider 17 may be omitted and fault detection accomplished by comparison of the reference and test wave forms even though of different amplitude.

FIG. 7 shows a reduced voltage generator 10 and full voltage generator 11 suitable for use with the invention and which preferably comprise a pair of Marx surge generators which are identical save for the voltage rating of their components. A voltage regulated power source 150 is coupled to a transformer 153 having a secondary provided with taps to give voltages required for testing all kv. classes of transformers. The output of this voltage selecting transformer 153 is used to simultaneously excite in parallel the voltage step-up transformers 154 and 155 whose ratio of transformation is the same as the ratio desired between the amplitudes of the reduced voltage and the full voltage test waves. A pair of simultaneously actuable switching devices 151 and 152 are disposed between regulated voltage source 150 and step-up transformers 154 and 155 so that the Marx generators 10 and 11 may be simultaneously excited. In operation, movable contact 175 of selector switch 13 is operated to fixed contact 159, thereby connecting reduced voltage generator 10 to the transformer 12 undergoing test. Switches 151 and 152 are then closed, thereby connecting exciting transformers 154 and 155 to voltage selecting transformer 153 whereby said exciting transformers are energized simultaneously. The manner in which the full and reduced voltage generators 10 and 11 respectively are energized and discharged is identical and for the sake of brevity, these operations will be discussed with reference to reduced voltage generator 10 only. The excitation of transformer 154 charges capacitors 156, 158 and 160 through rectifier 162 to a value equal to the peak negative amplitude of the voltage across the secondary of exciting transformer 154. Similarly, capacitors 164, 166 and 168 are charged through rectifier 161 to the peak positive amplitude of the voltage across the secondary of transformer 154.

Each pair of capacitors 156 and 164, 158 and 166 and 160 and 168 may be disposed in an individual metallic case 180, 181 and 182, respectively, with junction points Z, R and U grounded to their respective metallic cases. Each metallic case 180, 181 and 182 provides a leakage capacitance 163, 170 and 172 (shown dotted) between ground and points Z, R and U, respectively. After the charging operation has been completed, the junctions Z, R and U are at ground potential and are respectively connected to ground by leakage capacitances 163, 170 and 172; point X will be at a positive potential with respect to ground and point Y will be at an equal negative potential with respect to ground. Spark gaps $G_1$, $G_2$, $G_3$ and $G_4$ are so spaced that at the completion of the energizing cycle the following conditions prevail: (1) voltage across $G_1$ is lower than its critical sparkover value; (2) the voltages across gaps $G_2$, $G_3$ and $G_4$ are a little lower than their critical sparkover value; (3) the average voltage gradient across $G_2$ is a little lower than across $G_3$; and (4) the average gradient across $G_4$ is a little lower than across $G_3$.

Spark gap $G_1$ has a fixed electrode 169 and a movable electrode 171. When movable gap 171 is in its initial position (shown in full) the distance between electrodes 169 and 171 is sufficiently great so that the voltage thereacross is less than the critical sparkover value. The discharge of reduced voltage impulse generator 10 is initiated by operation of movable electrode 171 (by any suitable means not shown) toward fixed electrode 169 until a position is reached (shown in dotted) wherein the voltage is equal to the critical sparkoevr voltage of gap $G_1$ and the gap discharges.

When spark gap $G_1$ discharges, the resulting low impedance through the ionized gap effectively grounds point X. As a result, point Y jumps to a negative potential with respect to ground that is equal to the $X-Y$ voltage prior to discharge and point Z jumps to a negative potential with respect to ground that is equal to one-half of $X-Y$ potential. Since capacitors 158 and 166 are coupled to capacitors 156 and 164 through resistances 173 and 174, respectively, stray capacitance 170 tends to hold junction R at ground potential for a short interval. As a result, the entire voltage $X-Y$ plus the voltage $R-S$ is available to break down $G_2$ which voltage will exceed the critical sparkover voltage of $G_2$, resulting in the discharge thereof. In a similar manner spark gaps $G_3$ and $G_4$ are sequentially flashed over. When gap $G_4$ discharges, the capacitors are effectively coupled in series by virtue of the ionized path that exists across gaps $G_1$, $G_2$, $G_3$ and $G_4$ and this voltage is applied to the transformer 12 through switch 13. After the reduced voltage generator 10 has been discharged through the transformer undergoing test, movable contact 175 of switch 13 is operated to fixed contact 157, thereby connecting full voltage generator 11 to the transformer 12 undergoing test. Movable electrode 171' of spark gap $G_1'$ is then operated toward fixed electrode 169', thereby initiating the discharge of full voltage generator 11 in the manner previously discussed with respect to reduced voltage generator 10.

The sweep triggering means 100 of oscilloscope 20 is coupled to the reduced and full generators 10 and 11 by means of an antenna 176 disposed between the metallic cases 180 and 180' associated with capacitors 156—164 and 156'—164', respectively, of the full and reduced generators 10 and 11. This provides a weak capacitive linkage between the antenna and each of the metallic cases 180 and 180'. The shift in potential of these cases 180 and 180' incident to the discharge of spark gaps $G_1$ and $G_1'$ as discussed heretofore results in a signal at antenna 176 which is suitably coupled to the sweep triggering means 100 by a shielded cable 177. The signal received by the antenna, incident to the discharge of either spark gap $G_1$ or $G_1'$, actuates sweep triggering means 100 which initiates the sweep of oscilloscope 20 simultaneously with the discharge of either the reduced voltage generator 10 or full voltage generator 11 through the transformer 12. Shielded cable 177 is similarly coupled to inductive signal generating means 15 so that the discharge of both the full and reduced generators will initiate inductive cancellation signals synchronously with the full and reduced voltage impulses.

While only a single preferred embodiment of the invention has been illustrated and described, many variations and modifications thereof will be apparent to those skilled in the art, and consequently it is intended in the appended claims to cover all such modifications and variations which fall within the true spirit and scope of the invention.

I claim:

1. Apparatus for impulse testing a transformer winding, comprising, in combination, a first voltage impulse generating means, a second voltage impulse generating means having an output of greater magnitude than said first impulse means, whereby said first and second voltage impulse generating means deliver reduced and full amplitude voltage waves respectively, switching means for sequentially connecting said winding to said impulse generating means, whereby said first and second generating means are sequentially discharged through said winding, and oscilloscope means coupled to said winding and having a long persistence screen, whereby the current waves emerging from said winding as a result of the discharge of said first and second generating means through said winding may be compared on said screen.

2. Apparatus for impulse testing a transformer winding, comprising, in combination, a first impulse voltage generator, a second voltage impulse generator adapted to deliver an output of greater magnitude than said first generator, whereby said first and second generators deliver reduced and full surge impulses respectively, switching means for sequentially connecting said winding and said impulse generators, whereby said first and second generators may be sequentially discharged through said winding, oscilloscope means having sweep triggering means and a long persistence screen, said oscilloscope being coupled to the transformer winding for reproduction of the current waves emerging from said winding as a result of said surge impulses, means actuable between the discharges of said first and second generators and being electrically disposed between said winding and said oscilloscope for selectively varying the degree of coupling between said winding and said oscilloscope means so that said reproductions appear equal on said screen under normal no-fault conditions, and means for coupling said sweep triggering means to said surge generators, whereby said reproductions appear in phase on said screen.

3. Apparatus for impulse testing a transformer winding, comprising, in combination, a first impulse voltage generator, a second impulse voltage generator adapted to deliver an output greater in magnitude than said first generator, whereby said first and second generators deliver reduced and full voltage impulses respectively, switching means for sequentially connecting one end of said winding and said generators, whereby said first and second generators may be sequentially discharged through said winding, first and second capacitor means, said switching means also sequentially coupling said first capacitor means to the other end of said winding for charging thereof during the discharge of said first impulse generator through said winding and then coupling said second capacitor means to said other end of said winding for the charging thereof during the discharge of said second impulse generator through said winding, and signal means coupled to said capacitor means and responsive to a predetermined difference in the voltages to which said first and second capacitor means are charged.

4. In combination with a transformer winding to be tested, an impulse testing apparatus comprising a first voltage impulse generator, a second voltage impulse generator adapted to deliver an output of greater magnitude than said first generator, whereby said first and second generators deliver reduced and full wave surge impulses respectively, first switching means for sequentially connecting said winding to said first and second generators, an oscillograph, first and second energy storage means, signal means connected to said first and second energy storage means and responsive to a predetermined difference in energy stored therein, and means for coupling said winding to said oscillograph and to said energy storage means and including second switching means operable between the discharge of said first and second generators for sequentially coupling said winding to said first and second energy storage, said coupling means also including a voltage divider and third switching means operable simultaneously with said second switching means for coupling different portions of said voltage divider to said oscillograph and to said first and second energy storage means, whereby the reproduction of current waves emerging from said winding, incident to the discharge of said first and second generators through said winding, appear equal under normal no-fault conditions and also the energies stored in said first and second energy storage means are approximately equal under normal no-fault conditions.

5. In combination with a transformer winding to be tested, an impulse testing apparatus comprising first impulse voltage generating means, second impulse generating means adapted to deliver an output voltage of different magnitude than said first generating means, whereby the output voltage from one of said generating means is reduced in amplitude relative to the output voltage from the other of said generating means, switching means for sequentially connecting said winding and said generating means whereby said first and second generating means may be sequentially discharged through said winding, fault detecting means coupling to said winding for indicating when the current time integrals of the current emerging from said winding, resulting from the sequential discharge of said first and second generator through said winding, are of a different ratio than the output voltages from said first and second generating means, and current responsive means coupled to said transformer winding for visually reproducing current waves emerging from said winding, whereby the current waves emerging from said winding as a result of the sequential discharge of said first and second generators through said winding may be visually compared.

6. In combination with a transformer winding to be tested, an impulse testing apparatus comprising a first impulse voltage generator, a second voltage impulse generator adapted to deliver an output of greater magnitude than said first generator, whereby said first and second generators deliver reduced and full surge impulses respectively, switching means for sequentially connecting one end of said winding and said impulse generators whereby said first and second generators may be sequentially discharged through said winding, oscilloscope means having sweep triggering means and a long persistence screen, and fault detecting means for indicating when the current time integrals of sequentially applied current waves exceed a predetermined value, coupling means for coupling said oscilloscope means and said fault detecting means to said winding whereby the current waves emerging from the other end of said winding as a result of said impulses may be reproduced on said oscilloscope screen and also applied to said fault detecting means, said coupling means including voltage dividing means and second switching means actuable between the discharges of said first and second generators for coupling different portions of said voltage dividing means to said oscilloscope means and said fault detecting means so that said reproductions appear equal on said screen under normal no-fault conditions, and also the current-time integrals of the current waves emerging from said winding as a result of said sequentially applied impulses are equal approximately under no-fault conditions, and means for coupling said sweep triggering means to said surge generators, whereby said reproductions appear in phase on said screen.

7. In combination with a transformer winding to be tested, an impulse testing apparatus comprising a first voltage impulse generator, a second voltage impulse generator adapted to deliver an output of greater magnitude than said first generator, whereby said first and second generators deliver reduced and full wave surge impulses respectively, first switching means for sequentially connecting one end of said winding to said first and second generators, oscilloscope means having a sweep triggering means and a long persistence screen, means for coupling said oscilloscope means to said winding for reproduction of current waves emerging from said winding as a result of said surge impulses, means for coupling said sweep triggering means to said surge generators, whereby said reproductions appear in phase on said screen, first and second capacitor means, said coupling means including second switching means operable between the discharge of said first and second generators for sequentially coupling said first capacitor means to the other end of said winding for charging thereof during the discharge of said first impulse generator through said winding and then coupling said second capacitor means to said other end of said winding for the charging thereof during the discharge of said second impulse generator through said winding, signal means coupled to said capacitor means and responsive to a predetermined difference in the voltages to which said first and second capacitor means are charged, said coupling means also including a voltage divider and third switching means operable simultaneously with said second switching means for coupling different portions of said voltage divider to said oscilloscope means and to said first and second capacitor means whereby the reproduction of current waves emerging from said winding, incident to the discharge of said first and second generators through said winding, appear equal under normal no-fault conditions and also the charge on said first and second capacitors are equal under normal no-fault conditions.

8. Apparatus for impulse testing a transformer winding, comprising in combination, first impulse voltage generating means, second impulse generating means adapted to deliver an output voltage of different magnitude than said first generating means, whereby the output voltage from one of said generating means is reduced in amplitude relative to the output voltage from the other of said generating means, switching means for sequentially connecting said winding and said generating means whereby said first and second generating means may be sequentially discharged through said winding, and fault detecting means coupled to said winding for indicating when the current time integrals of the current emerging from said winding, resulting from the sequential discharge of said first and second generator through said winding, are of a different ratio than the output voltages from said first and second generating means.

9. In combination with a transformer winding to be tested, an impulse testing apparatus comprising first impulse voltage generating means, second impulse voltage generating means adapted to deliver an output voltage of different magnitude than said first generator, whereby the output voltage from said first generator is reduced in amplitude relative to the output voltage from said second generator, switching means for sequentially connecting said winding with said first and second generating means, whereby said first and second generating means may be sequentially discharged through said winding, indicating means having first and second inputs and operable in response to a predetermined difference in signals applied to said first and second inputs, switching means sequentially coupling said first and second inputs to said winding during the discharge of said first and second generators respectively, and voltage dividing switching means between said winding and said indicating means operable simultaneously with said switching means for adjusting the signal impressed upon said second input to approximately the same magnitude as that of the signal impressed upon said first input under no-fault conditions.

10. Apparatus for impulse testing a transformer winding comprising, in combination, means for generating reduced voltage and full voltage surge impulses and for sequentially discharging said reduced and full voltage impulses through said winding, and fault detecting means coupled to said winding and operable in response to a predetermined difference between signals applied sequentially thereto incident to the discharge of said reduced and full voltage impulses through said winding.

11. Apparatus for impulse testing a transformer winding, comprising, in combination first impulse voltage generating means, second impulse voltage generating means adapted to deliver an output voltage of different magnitude than said first generating means, switching means for sequentially connecting said winding to said impulse generating means whereby said first and second generating means may be sequentially discharged through said winding, and means coupled to said transformer winding for visually reproducing current waves emerging from said winding, whereby the current waves emerging from said winding as a result of the sequential discharge of said first and second generators through said winding may be visually compared.

12. In combination with a transformer winding to be tested, an impulse testing apparatus comprising a voltage impulse generator coupled to one end of said winding for delivering a surge impulse to said winding, the current wave emerging from the other end of said winding incident to said impulse having a capacitive component resulting from the capacitance of said winding, a capacitor connected to the other end of said winding and in series therewith, voltage responsive indicating means having an input coupled to said capacitor, capacitive voltage dividing means in parallel with said serially connected winding and capacitor, coupling means for applying a portion of the voltage across said capacitive voltage divider to said voltage responsive means in a sense opposite to that of the voltage across said serially connected capacitor resulting from said current wave, whereby at least a portion of the capacitive component of the voltage wave at said input is cancelled.

13. In combination with a transformer winding to be tested, an impulse testing apparatus comprising a voltage impulse generator coupled to one end of said winding for delivering an impulse surge to said winding, the current wave emerging from the other end of said winding incident to said surge having a capacitive component resulting from the distributed capacitance of said winding, voltage responsive indicating means having an input coupled to said winding for deriving a voltage signal proportional to said current wave, capacitive voltage dividing means coupled to said impulse generator, whereby a capacitive voltage wave is produced which is proportional to said capacitive component of said current wave emerging from said winding, and means for coupling a portion of said capacitive voltage dividing means to said input so that said capacitive voltage wave is applied to said input in a sense opposite to that of the voltage signal derived from said current wave, whereby at least a portion of said capacitive component of the electrical signal actuating said indicating means is cancelled.

14. In combination with a transformer winding to be tested, an impulse testing apparatus comprising a voltage impulse generator coupled to one end of said winding for delivering a surge impulse to said winding, the current wave emerging from the other end of said winding incident to said impulse having a capacitive noise component resulting from the distributed capacitance of said winding, means coupled to said winding for deriving a first signal which is a function of said current wave, means for producing a second signal proportional to said capacitive noise component, means for combining said first and second signals in opposite polarity so that at least a portion of said capacitive component of said current wave is cancelled, and indicating means responsive to the output of said combining means.

15. In combination with a transformer winding to be tested, an impulse testing apparatus comprising a voltage impulse generator coupled to said winding for applying a surge impulse to said winding, the current wave emerging from said winding as a result of said impulse having a noise component resulting from the distributed capacitance of said winding, voltage responsive indicating means coupled to said winding for deriving an electrical signal which is a function of said current wave, and means for increasing the signal-to-noise ratio of said derived signal including means coupled to said voltage responsive means for cancelling at least a portion of the capacitive noise component of said signal.

16. In combination with a transformer winding to be tested, an impulse testing apparatus comprising an impulse voltage generator coupled to one end of said winding for delivering a surge impulse to said winding, the current wave emerging from the other end of said winding incident to said impulse having a noise component resulting from the distributed capacitance of said winding, impedance means in series with the other end of said winding, whereby the voltage wave in said impedance means is a reproduction of said current wave emerging from said winding and also has a capacitive noise component, means for generating a signal proportional to said capacitive noise component of said voltage wave, means for coupling said impedance means and said capacitive component proportional signal producing means so that said generated capacitive noise component proportional signal is opposite in polarity to the capacitive noise component of said voltage wave, whereby the voltage wave from said impedance means is modulated by said capacitive noise component proportional signal, and indicating means responsive to said modulated signal.

17. In combination with a transformer winding to be tested, an impulse testing apparatus comprising a first impulse voltage generator, a second voltage impulse generator adapted to deliver an output of greater magnitude than said first generator, whereby said first and second generating means deliver reduced and full wave voltage impulses respectively, first switching means for electrically connecting one end of said winding sequentially to said first and second generating means, whereby said reduced and full wave voltage impulses may be sequentially discharged through said transformer winding, the current wave emerging from the other end of said winding incident to each said impulse having a capacitive component resulting from the distributed capacitance of said winding, a capacitor in series with said other end of said winding, first and second energy storage means, means operable between the discharge of said first and second generators for sequentially coupling said first and second energy storage means to said capacitor for charging a different one of said energy storage means during the discharge of each of said voltage generators through said winding, indicating means coupled to said first and second energy storage means and responsive to a predetermined difference in the voltages to which said first and second energy storage means are charged, a capacitive voltage divider in parallel with said serially connected winding and capacitor, said coupling means coupling a portion of the voltage across said capacitive voltage divider to said energy storage means in a sense opposite to that of the voltage across said serial connected capacitor resulting from said current wave, whereby a portion of the capacitive component of the current wave applied to said energy storage means is cancelled, said coupling means also including voltage dividing means and switching means operable between the discharge of said first and second impulse generators for selectively varying the degree of coupling between said capacitor and said first and second energy storage means and also between said capacitive voltage divider and said first and second energy storage means so that the charge on said first and second energy storage means resulting from the discharge of said reduced and full voltage waves through said winding is approximately equal under normal no-fault conditions.

18. In combination with a transformer winding to be tested, an impulse testing apparatus comprising a first impulse voltage generator, a second voltage impulse generator adapted to deliver an output of greater magnitude than said first generator, whereby said first and second generators deliver reduced and full wave voltage impulses respectively, switching means for electrically connecting one end of said winding sequentially to said first and second generators whereby said reduced and full wave voltage impulses may be sequentially impressed upon said transformer winding, each current wave emerging from the other end of said winding incident to one of said impulses having a capacitive component resulting from the distributed capacitance of said winding, a capacitor in series with the other end of said winding for deriving a signal which is a function of said current wave, oscilloscope means having a sweep triggering circuit coupled to said generators and a long persistence screen, capacitive voltage dividing means in parallel with said serially connected winding and capacitor, and means for coupling said oscilloscope means to said capacitor and also for coupling a portion of the voltage across said capacitive voltage divider to said oscilloscope means in a sense opposite that of the voltage across said capacitor resulting from said current wave, whereby a portion of the capacitive component of the voltage wave applied to the oscilloscope is cancelled, said coupling means including voltage divider switching means operable between the discharges of said first and second generators so that said reduced and full wave voltage impulses appear equal on said screen under no-fault conditions.

19. In combination with a transformer winding to be tested, an impulse testing apparatus comprising means for generating reduced and full voltage impulses and for delivering said impulses to one end of said winding, the current wave emerging from the other end of said winding incident to each of said impulses having a capacitive component, a capacitor in series with the other end of said winding, indicating means including oscilloscope means having a sweep triggering circuit and a long persistence screen, means for coupling said oscilloscope means to said capacitor for reproduction of the current waves emerging from said winding as a result of said surge impulses, means for coupling said sweep triggering means to said surge generators, whereby said reproductions appear in phase on said screen, said indicating means also including first and second energy storage means, said coupling means including second switching means operable between said voltage impulses for sequentially coupling said first energy storage means to said capacitor for charging said first energy storage means during the delivery of said reduced impulse to said winding and then coupling said second storage means to said capacitor for the charging of said second energy storage means during the delivery of said full voltage impulse to said winding; signal means coupled to said energy storage means and responsive to a predetermined difference in the voltage to which said first and second energy storage means are charged, a capacitive voltage divider in parallel with said serially connected winding and capacitor, said coupling means also coupling a portion of the voltage across said capacitive voltage divider to said indicating means in a sense opposite to that of voltage across said serially connected capacitor resulting from said current waves, whereby a portion of the capacitive component of the signals appearing at the input to said oscilloscope means and said energy storage means is cancelled, said coupling means also including voltage divider means and a third switching means operable simultaneously with said second switching means for varying the degree of coupling between said indicating means and both said capacitor and said capacitive voltage divider, whereby the reproduction of the current waves emerging from the said winding incident to the delivery of said reduced and full voltage impulses to said winding appear equal under no-fault conditions and also the charges on said first and second energy storage means are equal under no-fault conditions.

20. In combination with a transformer winding to be tested, an impulse testing apparatus comprising a first impulse voltage generating means, a second impulse generating means adapted to deliver an output voltage of different magnitude than said first generating means whereby the voltage impulse from said first generating means is reduced in amplitude relative to the voltage impulse from said second generating means, switching means for electrically connecting one end of said winding sequentially to said generating means, whereby said reduced and full impulses may be sequentially impressed upon said winding, the current wave emerging from the other end of said winding incident to each said impulse having a capacitive component resulting from the distributed capacitance of said winding, fault detecting means having an input coupled to said winding for indicating when the current time integrals of said current waves are of a different ratio than the voltage impulses from said first and second generating means, and means coupled to said fault detecting means for cancelling at least a portion of the capacitive component of the input signal to said detecting means.

21. In combination with a transformer winding to be tested, an impulse testing apparatus comprising a first impulse voltage generating means, a second impulse voltage generating means adapted to deliver a voltage impulse of different magnitude than said first generating means, switching means electrically interconnected between said winding and said impulse generating means for sequentially connecting said first and second impulse generating means to one end of said winding, whereby said reduced and full wave impulses may be impressed on said winding, each current wave emerging from the other end of said winding incident to one of said impulses having a capacitive component resulting from the distributed capacitance of said winding, voltage responsive means coupled to said transformer winding for deriving a voltage signal representative of said current wave and for giving a visual reproduction thereof, whereby said current waves resulting from the sequential discharge from said first and second generating means may be visually compared, and means coupled to said voltage responsive means for cancelling at least a portion of the capacitive component of said derived signal.

22. In combination with a transformer winding to be tested, an impulse testing apparatus comprising first impulse voltage generating means, second impulse voltage generating means adapted to deliver a voltage impulse of different magnitude than said first generator, switching means electrically interconnected between said winding and said impulse generating means for sequentially connecting said first and second impulse generating means to one end of said winding, whereby reduced and full wave impulses may be impressed on said winding, each current wave emerging from the other end of said winding incident to one of said impulses having a capacitive component resulting from the distributed capacitance of said winding, impedance means coupled to said transformer winding for deriving a voltage signal representative of the instantaneous value of said current wave and also having a capacitive component, voltage responsive indicating means coupled to said impedance for giving a visual reproduction of said derived signal whereby the instantaneous voltage waves in said winding incident to said reduced and full wave impulses may be visually compared, fault detecting means coupled to said impedance for indicating when the current-time integrals of said two current waves are of a different ratio than the voltage impulses from said first and second generating means, means for generating a capacitive signal proportional to the capacitive component of said derived signal, and means for coupling said signal generating means to said impedance so that the polarity of the capacitive component proportional signal is opposite to the polarity of said derived signal, whereby at least a portion of the capacitive component of said derived signal is cancelled.

23. In combination, a first transformer winding to be tested, a second winding inductively coupled to said first winding and having a center tap, and an impulse testing apparatus comprising a voltage impulse generator coupled to said first winding for delivering a surge impulse to said first winding, the current wave emerging from one end of said first winding incident to said impulse having an oscillation component, a first capacitor in series with said first winding, a second capacitor connected to said center tap, whereby the voltages across said first and second capacitors have oscillation components which are approximately 180 out of phase, impedance means interconnecting said center tap and the junction between said first capacitor and said first winding, said impedance means having first and second portions, voltage responsive indicating means coupled between the junction between said portions and each of said capacitors on the sides thereof opposite the junctions with said windings, said sides of said capacitors opposite the junctions with said windings being connected to said impulse generator.

24. In combination with a first transformer winding to be tested, a second winding inductively coupled to said first winding, and an impulse testing apparatus comprising means for impressing a steep wave front voltage surge to one end of said first winding, the current wave emerging from the other end of said first winding incident to said surge having an oscillation component, a first impedance in series with said first winding, a second impedance of the same type as said first impedance connected to said second winding, a third impedance means connecting the junction between said first winding and said first impedance with the junction between said second winding and said second impedance, the ends of said first and second impedances opposite said junctions being connected to said voltage surge impressing means, said third impedance means having first and second portions, and voltage responsive indicating means coupled to said third impedance means at the junction between said first and second portions and responsive to the signal therefrom.

25. In combination with a transformer winding to be tested, an impulse testing apparatus comprising a voltage impulse generator coupled to said winding for applying a surge impulse to said winding, the current wave emerging from said winding as a result of said impulse having an oscillation noise component, voltage responsive indicating means coupled to said winding for deriving an electrical signal which is representative of said current wave and for giving an indication thereof, and means for increasing the signal-to-noise ratio of said derived signal including means coupled to said voltage responsive means for cancelling at least a portion of the oscillation noise component of said derived electrical signal.

26. Apparatus for impulse testing a transformer winding comprising, in combination, means for generating reduced and full voltage impulses and for sequentially delivering said impulses to one end of said first winding, the current wave emerging from the other end of said winding incident to each of said impulses having an oscillation component, first and second capacitor means, switching means for sequentially coupling said first capacitor means to said other end of said winding for charging thereof during said reduced voltage impulse and then coupling said second capacitor means to said other end of said winding for the charging thereof during said full voltage impulse, signal means coupled to said capacitor means and responsive to a predetermined difference in the voltage to which said first and second capacitor means are charged, and means coupled to said capacitor means through said switching means for cancelling at least a portion of the oscillation component of said current wave.

27. In combination with a transformer winding to be tested, an impulse testing apparatus comprising a first impulse voltage generating means, a second impulse generating means adapted to deliver an output voltage of different magnitude than said first generating means, whereby the output voltage from said generating means is reduced in amplitude relative to the output voltage from said second generating means, switching means for connecting one end of said winding sequentially to said first and second generating means whereby said first and second generating means may be sequentially discharged through said winding, each current wave emerging from said winding as a result of one of said impulses having an oscillation component, fault detecting means having an input coupled to said winding for indicating when the current-time integrals of the two sequential waves emerging from said winding resulting from the sequential discharge of said first and second generating means through said winding are of a different ratio than the output voltages from said first and second generating means, and means coupled to said fault detecting means for cancelling at least a portion of the oscillation component of the signal at the input to said fault detecting means.

28. Apparatus for impulse testing a transformer winding comprising, in combination, means for generating reduced and full voltage impulses and for sequentially delivering said impulses to one end of said winding, the current wave emerging from the other end of said winding incident to each of said impulses having an oscillation component, oscilloscope means having sweep triggering means and a long persistence screen, said oscilloscope means being coupled to the other end of said winding for reproduction of the current waves emerging from said winding as a result of each of said voltage impulses, means actuable between the delivery of said reduced and full voltage impulses for selectively varying the degree of coupling between said winding and said oscilloscope means so that said reproductions appear equal on said screen under normal no-fault conditions, means for coupling said sweep triggering means to said surge generators, whereby said reproductions appear in phase on said screen, and means coupled to said oscilloscope means for cancelling at least a portion of said oscillation component.

29. In combination with a transformer winding to be tested, an impulse testing apparatus comprising a first impulse voltage generating means, a second impulse voltage generating means adapted to deliver an output voltage of different magnitude than said first generating means, switching means for sequentially connecting said winding to said impulse generators, whereby said first and second impulse generating means may be sequentially discharged through said winding, each current wave emerging from said winding incident to the discharge of one of said generating means having an oscillation component, indicating means having an input coupled to said transformer winding for deriving and visually reproducing a signal representative of the current emerging from said winding as a result of the discharge of one of said generating means through said winding, whereby said current waves may be visually compared, and means coupled to said indicating means for cancelling at least a portion of the oscillation component of said derived signal.

30. In combination with a transformer having a first winding to be tested and a second winding inductively coupled to said first winding, an impulse testing apparatus comprising means for generating reduced and full voltage impulses and for sequentially delivering said impulses to one end of said first winding, the current wave emerging from the other end of said first winding incident to each of said impulses having an oscillation component, a first capacitor connected to the other end of said first winding, a second capacitor connected to said second winding, an impedance interconnecting said other end of said first winding and the interconnection between said second winding and said second capacitor, said impedance having a first portion and a second portion, oscilloscope means having a sweep triggering circuit and a long persistence screen, means for coupling said oscilloscope means to the junction between said first and second portions of said impedance for reproduction of the current waves emerging from said windings as a result of said impulses, means for coupling said sweep triggering means to said impulse generating means, whereby said reproductions appear in phase on said screen, means including voltage dividing means between said junction and said oscilloscope means and switching means operable between the delivery of said voltage impulses to said winding for varying the degree of coupling between said junction and said oscilloscope means, whereby the reproductions of said current waves emerging from said winding appear equal on said screen under no-fault conditions.

31. In combination with a transformer having a first winding to be tested and a second winding inductively coupled to said first winding and having a center tap, an impulse testing apparatus comprising means for generating reduced and full voltage impulses and for sequentially delivering said impulses to one end of said first winding, the current wave emerging from the other end of said first winding incident to each of said impulses having an oscillation component, a first capacitor in series with the other end of said first winding and with said generating means, a second capacitor connected at one end to said center tap and at the other end to the junction between said first capactior and said generating means, an impedance interconnecting said center tap and said other end of said first winding and having first and second portions, oscilloscope means having a sweep triggering circuit and a long persistence screen, means for coupling said oscilloscope means to said impedance at the junction between said first and second portions for visual reproduction of the current waves emerging from said first winding as a result of said voltage impulses, means for coupling said sweep triggering means to said impulse generating means, whereby said reproductions appear in phase on said screen, first and second energy storage means, said coupling means including second switching means operable between the delivery of said first and second voltage impulses for sequentially coupling said first energy storage means to said junction for the charging thereof during said reduced voltage impulse and then coupling said second energy storage means to said junction for the charging thereof during said full voltage impulse, signal means coupled to said energy storage means and responsive to a predetermined difference in the voltage to which said first and second energy storage means are charged, said coupling means also including a voltage divider and a third switching means operable simultaneously with said second switching means for varying the degree of coupling between said junction and both said oscilloscope means and said first and second energy storage means, whereby the reproductions of said current waves emerging from said winding appear equal under no-fault conditions and also the charges on said first and second energy storage means are substantially equal under no-fault conditions.

32. In combination with a transformer having a first winding to be tested and a second winding inductively coupled to said first winding, an impulse testing apparatus comprising means for generating reduced and full voltage impulses and for sequentially delivering said impulses to one end of said first winding, the current wave emerging from the other end of said first winding incident to each of said impulses having an oscillation component, a first capacitor connected to the other end of said first winding, a second capacitor connected to said second winding, the sides of said capacitors opposite the junctions with said windings being connected in a return circuit to said generating means, an impedance interconnecting said other end of said first winding with the interconnection between said second winding and said second capacitor, said impedance having first and second portions, first and second energy storage means, coupling means including first switching means operable between the delivery of said reduced and full voltage impulses for sequentially coupling said first energy storage means to the junction between the first and second portions of said impedance for charging thereof during said reduced voltage impulse and then coupling said second energy storage means to said junction for charging thereof during said full voltage impulse, signal means coupled to said energy storage means and responsive to a predetermined difference in energy to which said first and second energy storage means are charged, said coupling means also including a voltage divider and means operable simultaneously with said first switching means for switching said voltage divider to vary the degree of coupling between said junction and said energy storage means, whereby the energies stored in said first and second energy storage means are substantially equal under no-fault conditions.

33. In combination with a transformer having a first winding to be tested and a second winding inductively coupled to said first winding, an impulse testing apparatus comprising first voltage impulse generating means, second voltage impulse generating means having an output of different magnitude than said first impulse generating means, whereby said first and second generating means deliver reduced and full amplitude voltage impulses respectively, switching means for connecting one end of said first winding sequentially to said first and second generating means whereby said first and second generating means may be sequentially discharged through said winding, the current wave emerging from the other end of said winding as a result of said impulse having an oscillation component and also having a capacitive component, signal comparison means coupled to said winding for deriving an electrical signal which is representative of each current wave emerging from said other end of said winding as a result of one of said impulses and for comparing said derived signals incident to said impulses, means coupled to said signal comparison means for cancelling at least a portion of the oscillation component of said derived signal, and means coupled to said signal comparison means for cancelling at least a portion of the capacitive component of said derived signal.

34. In combination with a transformer having a first winding to be tested and a second winding inductively coupled to said first winding, an impulse testing apparatus comprising first voltage impulse generating means, second voltage impulse generating means having an output of different magnitude than said first impulse generating means, whereby said first and second generating means deliver reduced and full amplitude voltage impulses respectively, switching means for connecting one end of said first winding sequentially to said first and second generating means whereby said first and second generating means may be sequentially discharged through said winding, the current wave emerging from the other end of said winding as a result of each said impulse having an oscillation component and also having a capacitive component, a first capacitive impedance means connected to said other end of said first winding, a second capacitive impedance means coupled to said second winding, the sides of said capacitive impedances opposite the junctions with said windings being connected to said generating means, impedance means connecting said other end of said first winding with the junction between said second winding and said second capacitive impedance means and having first and second portions and a tap therebetween, signal comparison means coupled to said tap for comparing the current signals emerging from the other end of said first winding as a result of said impulses, capacitive voltage dividing means in parallel with said first winding and said first capacitive impedance means and coupling means for applying a portion of the voltage across said capacitive voltage divider to said signal comparison means in a sense opposite to that of the signals resulting from said impulses, whereby at least a portion of said capacitive component is cancelled.

35. In combination with a transformer having a first winding to be tested and a second winding inductively coupled to said first winding and having a center tap, an impulse testing apparatus comprising means for generating reduced and full voltage impulses and for sequentially delivering said impulses to one end of said first winding, the current wave emerging from the other end of said first winding incident to each of said impulses having capacitive and oscillation components, a first capacitor connected to the other end of said first winding and in series with said generating means, a second capacitor connected at one end to said center tap and at the other end to the junction between said first capacitor and said generating means, an impedance interconnecting said center tap and the other end of said first winding and having first and second portions, capacitive voltage dividing means in parallel with said serially connected first winding and first capacitor, indicating means including oscilloscope means having a sweep triggering circuit and a long persistence screen, means for coupling said oscilloscope means to the junction between said first and second portions of said impedance for reproduction of the current waves emerging from said winding as a result of said voltage impulses, means for coupling said sweep triggering means to said impulse generating means, whereby said reproductions appear in phase on said screen, said indicating means also including first and second energy storage means, said coupling means including switching means operable between the delivery of said reduced and full voltage impulses for sequentially coupling said first energy storage means to said junction for charging thereof during said reduced voltage impulse and then coupling said second energy storage means to said junction for charging thereof during said full voltage impulse, signal means coupled to said energy storage means and responsive to a predetermined difference in energy to which said first and second energy storage means are charged, said coupling means also applying a portion of the voltage across said capacitive voltage divider to said indicating means in a sense opposite that of the voltage at said junction resulting from said current waves, whereby at least a portion of the capacitive component of the voltage at said junction is cancelled, said coupling means also including a voltage divider and a third switching means operable simultaneously with said second switching means for varying the degree of coupling between said junction and both said oscilloscope means and said energy storage means, whereby the reproductions of said current waves emerging from said winding appear equal on said screen under no-fault conditions and also the energies stored in said first and second energy storage means are substantially equal under no-fault conditions.

36. An apparatus for impulse testing a transformer winding comprising a voltage impulse generator coupled to one end of said winding for delivering a surge impulse to said winding, the current wave emerging from the other end of said winding incident to said impulse having an inductive noise component resulting from the inductance of said winding, voltage responsive means coupled to said winding for deriving an electrical signal which is a function of said current wave and for giving an indication thereof, and means for increasing the signal-to-noise ratio of said derived signal including means coupled to said voltage responsive indicating means for cancelling at least a portion of the inductive noise component of said signal.

37. An apparatus for impulse testing a transformer winding comprising, in combination, a voltage impulse generator coupled to one end of said winding for delivering a surge impulse to said winding, the current wave emerging from the other end of said winding incident to said impulse having an inductive noise component, means coupled to said winding for deriving a first signal which is a function of said current wave, means for generating a second signal proportional to said inductive noise component, said second signal generating means being initiated by said impulse generator so that said first and second signals are in synchronism, means for combining said first and second signals in opposite polarity so that at least a portion of said inductive noise component of said first signal is cancelled, and indicating means responsive to the output of said combining means.

38. Apparatus for impulse testing a transformer winding comprising, in combination, a voltage impulse generator coupled to said winding for applying a surge impulse to said winding, the current wave emerging from said winding as a result of said impulse having oscillation, capacitive and inductive noise signal components, indicating means coupled to said winding for deriving a voltage which is representative of said current wave and for giving an indication thereof, and means for increasing the signal-to-noise ratio of said derived voltage including means coupled to said voltage responsive means for cancelling at least a portion of said noise signal of said derived voltage.

39. In combination with a transformer having a first winding to be tested and a second winding inductively coupled to said first winding and having a center tap, an impulse testing apparatus comprising means for generating reduced and full voltage impulses and for sequentially delivering said impulses to one end of said first winding, the current wave emerging from the other end of said first winding incident to each of said impulses having capacitive, inductive and oscillation components, a first capacitor in series with the other end of said first winding, a second capacitor connected to said center tap, the sides of said first and second capacitors opposite the junctions with said windings being connected to said generating means, an impedance interconnecting said center tap and the other end of said first winding, said impedance having first and second portions, capacitive voltage dividing means in parallel with said serially connected first winding and first capacitor, means for generating an inductive signal proportional to the inductive component of the current wave emerging from said other end of said first winding, said inductive signal generating means being initiated by the discharge of said first and second voltage impulses through said first winding so that said inductive signal will be in synchronism with the inductive component of said current wave emerging from the other end of said first winding, indicating means including oscilloscope means having a sweep triggering means and a long persistence screen, means for coupling said oscilloscope means to the junction of said first and second portions of said impedance for reproduction of the current waves emerging from said winding as a result of said voltage impulses, means for coupling said sweep triggering means to said impulse generating means, whereby said reproductions appear in phase on said screen, said indicating means also including first and second energy storage means, said coupling means including second switching means operable between the delivery of said reduced and full voltage impulses for sequentially coupling said first energy storage means to said junction for charging thereof during said reduced voltage impulse and then coupling said second energy storage means to said junction for charging thereof during the full voltage impulse, signal means coupled to said energy storage means and responsive to a predetermined difference in the energies to which said first and second energy storage means are charged, said coupling means also applying a portion of the voltage across said capacitive voltage dividing means to said indicating means in a sense opposite that of the voltage at said junction resulting from said current waves, whereby at least a portion of the capacitive component of the signal at the input to said indicating means is cancelled, said coupling means also including a voltage divider and a third switching means operable simultaneously with said second switching means for varying the degree of coupling between said junction and said indicating means, whereby the reproduction of current waves emerging from said winding appear equal on said screen under no-fault conditions and also the energies stored in said first and second energy storage means are substantially equal under no-fault conditions, said coupling means also coupling said inductive generating means to said indicating means so that at least a portion of the inductive component of said input signal to said indicating means is cancelled.

40. In combination with a transformer having a first winding to be tested, a second winding inductively coupled to said first winding and having a center tap, an impulse testing apparatus comprising means for generating reduced and full voltage impulses and for sequentially delivering said impulses to one end of said first winding, the current wave emerging from the other end of said first winding incident to each of said impulses having capacitive, inductive and oscillation components, a first capacitor in series with the other end of said first winding, a second capacitor connected to said center tap, the sides of said first and second capacitors opposite the junctions with said windings being connected to said generating means, an impedance interconnecting said center tap and the other end of said first winding, said impedance having first and second portions, means for generating an inductive signal proportional to the inductive component of the current wave emerging from said other end of said first winding, said inductive signal generating means being initiated by the discharge of said first and second voltage impulses through said first winding so that inductive signal will be in synchronism with the inductive component of said current waves emerging from the other end of said first winding, indicating means including oscilloscope means having a sweep triggering means and a long persistence screen, means for coupling said oscilloscope means to the junction of the first and second portions of said impedance for reproduction of the current waves emerging from said winding as a result of said voltage impulses, means for coupling said sweep triggering means to said impulse generating means whereby said reproductions appear in phase on said screen, said indicating means also including first and second energy storage means, said coupling means including second switching means operable between the delivery of said reduced and full voltage impulses for sequentially coupling said first energy storage means to said junction for charging thereof during said reduced voltage impulse, and then coupling said second energy storage means to said junction for charging thereof during the full voltage impulse, signal means coupled to said energy storage means and responsive to a predetermined difference in the energies to which said first and second energy storage means are charged, said coupling means also including a voltage divider and a third switching means operable simultaneously with said second switching means for varying the degree of coupling between said junction and said indicating means, whereby the reproduction of current waves emerging from said winding appear equal on said screen under no-fault conditions and also the energy on said first and second energy storage means are substantially equal under no-fault conditions, said coupling means also coupling said inductive generating means to said indicating means so that at least a portion of the inductive component of the voltage applied to said oscilloscope and to said first and second energy storage means is cancelled.

41. In combination with a transformer having a first winding to be tested, a second winding inductively coupled to said first winding and having a center tap, an impulse testing apparatus comprising means for generating reduced and full voltage impulses and for sequentially delivering said impulses to one end of said first winding, the current wave emerging from the other end of said first winding incident to each of said impulses having capacitive, inductive and oscillation components, a capacitor in series with the other end of said first winding, capacitive voltage dividing means in parallel with said serially connected first winding and first capacitor, means for generating an inductive signal proportional to the inductive component of the current wave emerging from said other end of said first winding, said inductive signal generating means being initiated by the discharge of said first and second voltage impulses through said first winding so that inductive signals will be in synchronism with the inductive component of said current waves emerging from the other end of said first winding, indicating means including oscilloscope means having a sweep triggering means and a long persistence screen, means for coupling said oscilloscope means to said capacitor for reproduction of the current waves emerging from said winding as a result of said voltage impulses, means for coupling said sweep triggering means to said impulse generating means whereby said reproductions appear in phase on said screen, said indicating means also including first and second energy storage means, said coupling means including second switching means operable between the delivery of said reduced and full voltage impulses for sequentially coupling said first energy storage means to said capacitor for charging thereof during said reduced voltage impulse, and then coupling said second energy storage means to said capacitor for charging thereof during the full voltage impulse, signal means coupled to said energy storage means and responsive to a predetermined difference in the energies to which said first and second energy storage means are charged, said coupling means also applying a portion of the voltage across said capacitive voltage dividing means to said indicating means in a sense opposite that of the voltage in said capacitor resulting from said current waves, whereby at least a portion of the capacitive component of the signal at the input to said indicating means is cancelled, said coupling means also including a voltage divider and a third switching means operable simultaneously with said second switching means for varying the degree of coupling between said capacitor and said indicating means, whereby the reproduction of current waves emerging from said winding appear equal on said screen under no-fault conditions and also the energies stored in said first and second energy storage means are substantially equal under no-fault conditions, said coupling means also coupling said inductive generating means to said indicating means so that at least a portion of the inductive component of said input signal to said indicating means is cancelled.

42. In combination with a transformer winding to be tested, an impulse testing apparatus comprising a voltage impulse generator coupled to said winding for applying a surge impulse to said winding, the current wave emerging from said winding as a result of said impulse having an oscillation noise component and a capacitive noise component, indicating means coupled to said winding for deriving an electrical signal which is representative of said current wave and for giving an indication thereof, means for increasing the signal-to-noise ratio of said derived signal including means coupled to said indicating means for cancelling at least a portion of the oscillation noise component of said derived electrical signal and also including means coupled to said indicating means for cancelling at least a portion of the capacitive noise component of said derived signal.

43. Apparatus for impulse testing a transformer winding comprising, in combination, a first impulse generator, a second impulse generator adapted to deliver an output of greater magnitude than said first generator, whereby said first and second generators deliver reduced and full surge impulses respectively, switching means for sequentially connecting said winding and said impulse generators, whereby said first and second generators may be sequentially discharged through said winding, oscilloscope means coupled to said winding and having a long persistence screen, and means operable between the discharge of said first and second generators for selectively varying the degree of coupling between said winding and said oscilloscope means so that the reproductions of the current waves emerging from said winding as a result of said surge impulses appear equal on said screen under normal no-fault conditions.

References Cited in the file of this patent

UNITED STATES PATENTS

| | | |
|---|---|---|
| 2,578,499 | Bauer | Dec. 11, 1951 |
| 2,815,481 | Rohats | Dec. 3, 1957 |
| 2,901,695 | Weed | Aug. 25, 1959 |

OTHER REFERENCES

Cloke et al.: "True Dielectric Breakdown Strength of Cable Papers," Electrical Engineering, November 1948, p. 1072.

Rohats et al.: "Winding Insulation Testers," General Electric Review, September 1951, pp. 51–55.

Hagenguth et al.: "Impulse Corona Detection and Measurement," Electrical Engineering, August 1952, p. 706.